United States Patent

Moore

Patent Number: 5,538,169
Date of Patent: Jul. 23, 1996

[54] DUAL COVER VEHICLE RACK CARGO CARRIER

[76] Inventor: Michael W. Moore, 3207 31st Ave. W., Seattle, Wash. 98199

[21] Appl. No.: 389,036

[22] Filed: Feb. 15, 1995

[51] Int. Cl.⁶ .............................. B60R 9/00; B60R 9/055
[52] U.S. Cl. ..................... 224/328; 224/309; 190/109; 190/111
[58] Field of Search .............................. 224/309, 328, 224/209; 190/100, 109, 111, 119, 120, 25, 26, 103, 102; 220/256, 259; 383/61, 80, 97

[56] References Cited

U.S. PATENT DOCUMENTS

| | | | |
|---|---|---|---|
| 1,211,853 | 11/1917 | Bag | 383/61 |
| 2,454,608 | 11/1948 | Meyerdick | 224/328 |
| 2,474,322 | 6/1949 | Quinn | 383/80 |
| 3,955,732 | 5/1976 | Boschen . | |
| 4,050,614 | 9/1977 | Simpson . | |
| 4,738,340 | 4/1988 | Crespi | 190/111 |
| 4,779,779 | 10/1988 | Haugland | 224/328 |
| 4,932,506 | 6/1990 | Kim | 190/111 |
| 5,012,964 | 5/1991 | Falletta et al. | 224/209 |
| 5,096,107 | 3/1992 | VanSon | 224/328 |
| 5,143,188 | 9/1992 | Robinet | 190/103 |
| 5,288,003 | 2/1994 | MacDonald | 224/328 |
| 5,358,162 | 10/1994 | Hill | 224/328 |

FOREIGN PATENT DOCUMENTS

| | | | |
|---|---|---|---|
| 869852 | 7/1952 | Germany | 190/119 |
| 159831 | 2/1952 | Sweden | 224/328 |

*Primary Examiner*—Henry J. Recla
*Assistant Examiner*—Gregory Vidovich
*Attorney, Agent, or Firm*—Craine & Jackson

[57] ABSTRACT

A collapsible, cargo carrier designed to be attached to the rack on the roof or truck lid on a vehicle. The carrier includes an enclosure made of durable, water-proof, coated vinyl material with a closeable inner lid. An outer lid is disposed over the inner lid and the enclosure to provide two wind and water-proof barriers over the cargo. The outer lid is attached along one edge to the front panel of the enclosure via a flexible, water-proof hinge also made of coated vinyl material. The enclosure and inner and outer lids are made of coated vinyl material which enables them to be sewn or heat welded together during manufacturing. A plurality of adjustable anchor straps are disposed longitudinally over the cargo carrier which are used to selectively attach it to the rack. A plurality of compression straps are disposed transversely over the cargo carrier which are used to adjust the shape of the carrier to the shape of the cargo items carried therein and to make the cargo carrier more aerodynamic.

6 Claims, 2 Drawing Sheets

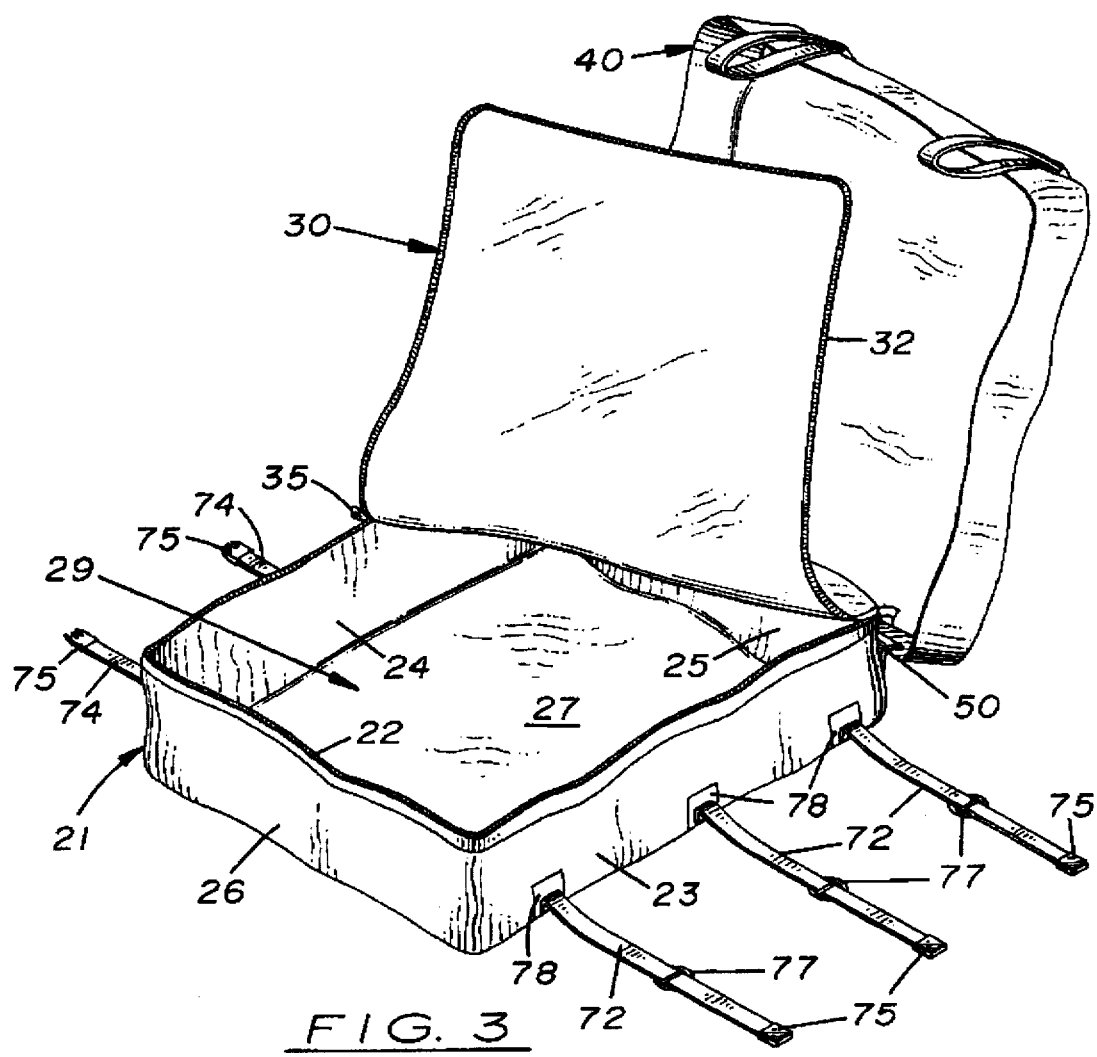
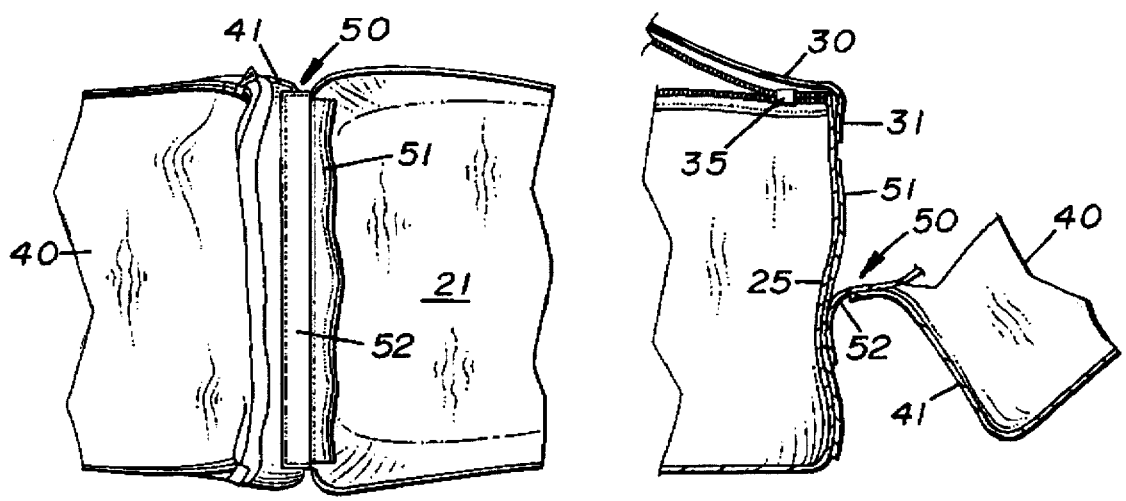
FIG. 3
FIG. 4
FIG. 5

5,538,169

DUAL COVER VEHICLE RACK CARGO CARRIER

BACKGROUND OF THE INVENTION

1. Field of the Invention

This invention relates to package and article carriers and, more particularly, to water-proof, vehicle rack cargo carriers.

2. Description of the Related Art

Today, many vehicles are equipped with roof or truck lid racks upon which various cargo items, such as luggage, boxes, sleeping bags, camping equipment, ski equipment, etc., may be transported. Many of these cargo items are wind or water sensitive, or have shapes which prevent them from being individually attached or bundled with other cargo items and attached to the rack. In order to transport these cargo items on the rack, they first be placed inside a larger carrier capable of being attached to the rack.

One drawback with using a larger carrier to transport cargo items is that access to the cargo items may be limited. Other drawbacks are that the larger carrier cannot be stored in a compact manner or adjusted in shape to accommodate different shaped cargo items and to make it more aerodynamic during use.

SUMMARY OF THE INVENTION

It is an object of the present invention to provide a cargo carrier capable of being selectively attached to a standard vehicle rack.

It is another object of the present invention to provide such a cargo carrier that fully protects the cargo items placed therein from wind or water.

It is a further object of the present invention to provide such a cargo carrier that is adjustable in shape to accommodate different cargo items placed therein and to make it more aerodynamic during use.

It is a still further object of the present invention to provide such a cargo carrier that can be easily folded for compact storage when not in use.

These and other objects are met by a cargo carrier capable of being separately attached to a standard vehicle rack which comprises a flexible enclosure made of durable, water-proof material designed to be folded for compact storage and unfolded for attachment to a standard vehicle rack. The enclosure has a closeable, water-proof inner lid which covers the top opening of the enclosure. The enclosure also has an outer lid made of durable, water-proof material which acts as an outer protective barrier to fully cover the inner lid and the side panels of the enclosure. The outer lid also partially extends over the enclosure's front panel and attaches thereto by a water-proof, flexible hinge. The flexible hinge allows the user to pull the outer lid completely off the enclosure so that the inner lid may be fully opened to expose the entire storage cavity located inside the enclosure. A plurality of parallel aligned, adjustable anchor straps are provided which, during use, directly attach the cargo carrier to the cross-members on the rack. Also provided are a plurality of compression straps aligned in a parallel manner and perpendicular to the anchor straps which, during use, conform the outer shape of the cargo carrier to the various cargo items carried therein to make the cargo carrier more aerodynamic.

BRIEF DESCRIPTION OF THE DRAWINGS

FIG. 3 is a perspective view of the cargo container showing the outer and inner lids pulled back to an opened position.

FIG. 4 is a top plan view of a section of the cargo container showing the hinge disposed between the front surface of the enclosure and the outer lid.

FIG. 5 is a side elevational view of the cargo carrier showing the outer lid attached to the hinge and pulled back to the opened position.

DESCRIPTION OF THE PREFERRED EMBODIMENT(S)

Figure 1:
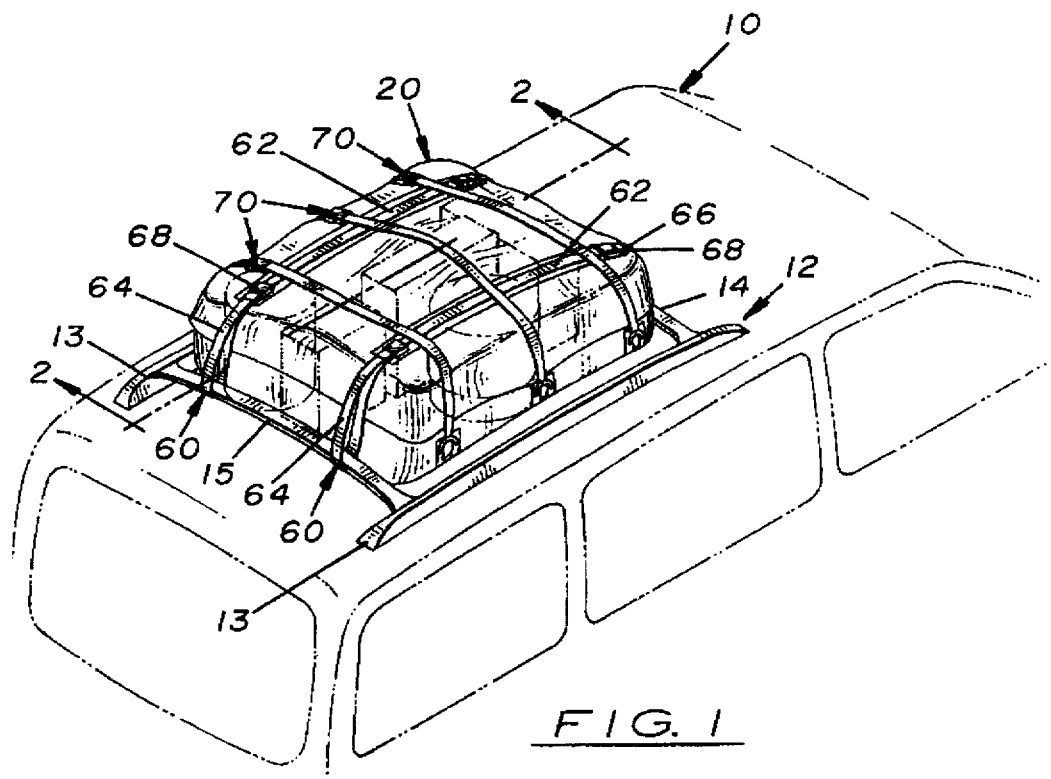
FIG. 1 is a perspective view of the cargo container attached to a vehicle roof rack.

Shown in the accompanying FIGS. 1–5, there is shown a cargo carrier, generally referred to as 20, designed to be separately attached to a standard rack 12 attached to a vehicle 10.

The cargo carrier 20 comprises a flexible, collapsible enclosure 21 made of durable, water-proof material. The enclosure 21 is square or rectangular in shape and includes right and left side panels 23, 24, respectively, front and rear panels 25, 26, respectively, and a bottom panel 27. A top opening 29 is formed in the enclosure 21 thereby enabling various shaped cargo items 90–92 to be placed and transported in the storage cavity 28 formed therein.

Disposed over the top opening 29 of the enclosure 21 is a flexible inner lid 30. The front edge 31 of the inner lid 30 is sewn and/or heat welded to the enclosure's front panel 25, thereby enabling it to be pulled in a forward direction on the vehicle to fully expose the storage cavity 28. Disposed between the peripheral edge 32 of the inner lid 30 and the upward extending edge 22 of the enclosure 21 is a connecting means which removably attaches the inner lid 30 to the enclosure 21. In the preferred embodiment, the connecting means comprises a slide connector 35. Also, in the preferred embodiment, the inner lid 30 is made of durable, water-proof material, such as coated vinyl material weighing approximately 19 oz. per sq. yd.

A flexible outer lid 40 made of durable, water-proof material is disposed over the enclosure 21 covering the inner lid 30 and the enclosure's right, left, and rear panels 23–25, respectively. The front surface 41 of the outer lid 40 extends over the front panel 25 of the enclosure 21 and is affixed thereto via a flexible, water-proof hinge 50. In the preferred embodiment, the outer lid 40 is made of coated vinyl material weighing approximately 19 oz. per sq. yd.

As shown more clearly in FIGS. 4 and 5, the flexible, water-proof hinge 50 comprises a rectangular shaped main panel 51 positioned longitudinally over the entire outer surface of the front panel 25. In the preferred embodiment, the main panel 51 is welded or adhesively attached to the front panel 25. A pivoting panel 52 is partially welded or adhesively attached along one side to the outer surface of the front surface 41 of the outer lid 40. The opposite side of the pivoting panel 52 is welded or adhesively attached to the outside surface of the main panel 51, thereby pivotally attaching the outer lid 40 to the enclosure's front panel 25. In the preferred embodiment, the main panel 51 and pivoting panel 52 are made of coated vinyl material weighing approximately 28 oz. per sq. yd.

Figure 2:
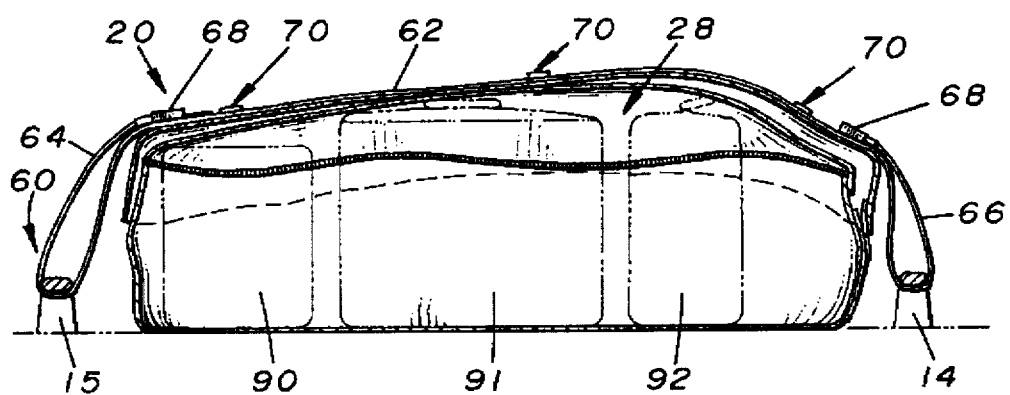
FIG. 2 is a sectional, side elevational view of the cargo container taken alone line 2—2 in FIG. 1.

As shown in FIGS. 1 and 2, a plurality of adjustable anchor straps 60 are used to attach the cargo carrier 20 to the front and rear cross-members 14, 15, respectively, on the vehicle rack 12. In the preferred embodiment, two anchor straps 60 are provided which are spaced apart and aligned in a parallel manner, longitudinally over the outer lid 40. Each anchor strap 60 comprises a main strap element 62 welded or adhesively attached to the top surface of the outer lid 40, and two adjustable smaller strap elements 64, 66 attached to the opposite ends of the main strap element 62. A coupling connector 68 is disposed between the ends of the two smaller strap elements and the opposite ends of the main strap element 62 to interconnect the smaller strap elements 64, 66 thereto. During use, the smaller strap elements 64, 66 are placed around the front and rear cross-members 15, 14, respectively, and connected to the opposite ends of the main strap element 62. The smaller strap elements 64, 66 are then adjusted in length to securely attach the cargo carrier 20 to the rack 12.

Also provided on the cargo carrier 20 are a plurality of adjustable compression straps 70 used to help conform the outer shape of the cargo carrier 20 to the cargo item 90–92 carried inside the storage cavity 28 and to make the cargo carrier 20 more aerodynamic. As shown more clearly in FIG. 3, three compression straps 70 are provided which are spaced apart and aligned in a parallel manner, transversely over the outer lid 40 and the anchor straps 60. Each compression strap 70 comprises a first strap member 72 and a second strap member 74 selectively interconnected by a coupling connector 75. Each first strap member 72 includes an adjustable ring 77 which enables it to be selectively adjusted in length. The proximal ends of each first and second strap member 72, 74 are attached to a small patch 78 welded or adhesively attached to the outside surface of the enclosure's right and left side panels 23, 24, respectively. During use, the first and second strap members 72, 74 are first interconnected by the coupling connector 75 and then adjusted in length so that the outer shape of the enclosure 21 conforms to the cargo items 90–92 contained therein.

To use the cargo carrier 20, the enclosure 21 is first placed on the rack 12 between the front and rear cross-members 14, 15, respectively. The anchor straps 60 and compression straps 70 are disconnected so that the outer lid 40 may be pulled back, to expose the inner lid 30. The slide connector 35 disposed between the inner lid 30 and the enclosure 21 is then moved to disconnect the inner lid 30 from the enclosure 21, to allow full access to the storage cavity 28. The cargo items 90–92 are then placed inside the storage cavity 28. The inner lid 30 is then pulled rearward over the storage cavity 28 and the slide connector 35 is moved to securely connect the inner lid 30 to the enclosure 21. The outer lid 40 is then pulled rearward and over the right, left and rear panels 23–25 to fully cover the inner lid 30 and the enclosure 21. The three anchor straps 60 are then connected at opposite ends to the rack's two cross-members 14, 15. The smaller strap elements 64, 66 are connected to the main strap elements 62 using the coupling connector 68 and then adjusted in length. The first and second strap members, 72, 74, respectively, on the three compression straps 70 are then placed transversely over the outer lid 40 and anchor straps 60 and interconnected via coupling connectors 75. The compression straps 70 are then adjusted in length so that the outer shape of the cargo carrier 20 conforms to the shape of the cargo items 90–92 and to make it more aerodynamic. The cargo items 90–92 may be placed inside the storage cavity 28 so that the outer shape of the cargo carrier forms a forward-directing wedge structure.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A water-proof cargo carrier for a vehicle rack, comprising:

a) a flexible enclosure having a bottom panel, right and left side panels front and rear panels, and a top opening; said enclosure being made of flexible, water-proof material enabling said enclosure to be folded in a compact manner;

b) an inner lid disposed over said top opening of said enclosure for selectively covering said top opening of said enclosure;

c) an outer lid disposed over said inner lid and said right and left side panels of said enclosure, said outer lid being made of water-proof material;

e) a connecting means disposed between said inner lid and said enclosure, said connecting means capable of selectively closing said inner lid on said enclosure;

f) a flexible, water-proof hinge disposed between said outer lid and said front panel of said enclosure to attach said outer lid to said enclosure;

g) a plurality of parallel aligned, adjustable anchor straps for attaching said cargo carrier to said rack, and;

h) a plurality of parallel aligned, adjustable compression straps aligned perpendicular to said anchor straps for further securing said cargo carrier to said rack and for adjusting the aerodynamic shade of said cargo carrier when objects are placed inside said enclosure, each said compression strap includes first and second strap members capable of being selectively interconnected, each of said first strap members having a first end attached to an external side of one of said side panels and a second end, each of said second strap members having a first end attached to an external side of the other of said side panels and a second end, wherein said second end of said first strap member is attachable to said second end of said second strap member.

2. A vehicle rack cargo carrier, as recited in claim 1, wherein said hinge includes a main panel attached to said front panel of said enclosure, and a pivoting panel attached along one edge to said main panel and along an opposite edge to said outer lid.

3. A vehicle rack cargo carrier, as recited in claim 1, wherein said inner lid and said outer lid are made of coated vinyl material.

4. A vehicle rack cargo carrier, as recited in claim 3, wherein said coated vinyl material used to make said inner lid and said outer lid weighs approximately 19 oz. per sq. yd.

5. A vehicle rack cargo carrier, as recited in claim 2, wherein said main panel and said pivoting panel are made of coated vinyl material.

6. A vehicle rack cargo carrier, as recited in claim 5, wherein said coated vinyl material used to make said main panel and said pivoting panel weights approximately 28 oz. per sq. yd.

\* \* \* \* \*